US 6,649,090 B2

(12) United States Patent
Funaki et al.

(10) Patent No.: US 6,649,090 B2
(45) Date of Patent: Nov. 18, 2003

(54) LIQUID COMPOSITION, FLAVOR MODIFICATION MATERIAL, FLAVOR MODIFICATION METHOD, AIR-CONDITIONING MATERIAL, INTERIOR/EXTERIOR CONSTRUCTION MATERIAL, FRESHNESS PRESERVATION MATERIAL, STORAGE, EQUIPMENT, ROOM INTERIOR ITEMS AND FITTINGS AND EQUIPMENT

(75) Inventors: Motokatsu Funaki, Fujisawa (JP); Teruo Tamanoi, Shizuoka (JP); Kouji Yanagimachi, Shizuoka (JP); Akifusa Funaki, Fujisawa (JP)

(73) Assignee: Gantan Beauty Industry Co., Ltd., Fujisawa (JP)

( * ) Notice: Subject to any disclaimer, the term of this patent is extended or adjusted under 35 U.S.C. 154(b) by 55 days.

(21) Appl. No.: 09/731,759

(22) Filed: Dec. 8, 2000

(65) Prior Publication Data

US 2002/0031572 A1 Mar. 14, 2002

(51) Int. Cl.$^7$ ............................... H01B 1/00; C09D 1/00
(52) U.S. Cl. .................. 252/500; 252/503; 252/506; 252/505; 252/511; 106/286.1; 106/286.2; 106/286.4
(58) Field of Search ................. 252/500, 505; 106/286.1, 286.2; 424/600, 617; 313/479; 250/423

(56) References Cited

U.S. PATENT DOCUMENTS

| | | | |
|---|---|---|---|
| 6,198,212 B1 | * | 3/2001 | Kim et al. .................. 313/479 |
| 6,294,006 B1 | * | 9/2001 | Andou ..................... 106/14.05 |
| 2003/0098420 A1 | * | 5/2003 | Fujino .................... 250/423 R |

FOREIGN PATENT DOCUMENTS

| | | | |
|---|---|---|---|
| EP | 1132445 A2 | * 9/2001 | ............ C09J/11/04 |
| JP | 6-268282 | 9/1994 | |
| JP | 10-270146 | 10/1998 | |
| JP | 11-155960 | 6/1999 | |
| JP | 11-165167 | 6/1999 | |
| JP | 2000-294 | 1/2000 | |
| JP | 2001-19420 | 1/2001 | |

OTHER PUBLICATIONS

Kageyama, "Sciene or Bunk, negative ion fad has Japanese feeling good", Jun. 9, 2002. The Associated Press at centredaily.com.*

* cited by examiner

Primary Examiner—Margaret Einsmann
Assistant Examiner—Kallambella Vijayakumar
(74) Attorney, Agent, or Firm—Oblon, Spivak, McClelland, Maier & Neustadt, P.C.

(57) ABSTRACT

A liquid composition is formed into a coating layer state in which negative ions are steadily released. The liquid composition includes a finely powdered mineral that generates negative ions mixed with a binder liquid that is conductive and/or a binder liquid in which a conductive substance is dispersed.

7 Claims, 2 Drawing Sheets

$17$O-NMR SPECTRUM OF WATER TREATED WITH GARNET $^{17}$O-NMR SPECTRUM OF DISTILLED WATER

US 6,649,090 B2

LIQUID COMPOSITION, FLAVOR MODIFICATION MATERIAL, FLAVOR MODIFICATION METHOD, AIR-CONDITIONING MATERIAL, INTERIOR/EXTERIOR CONSTRUCTION MATERIAL, FRESHNESS PRESERVATION MATERIAL, STORAGE, EQUIPMENT, ROOM INTERIOR ITEMS AND FITTINGS AND EQUIPMENT

BACKGROUND OF THE INVENTION

1. Field of the Invention

The present invention relates to a liquid composition, flavor modification material, flavor modification method, air-conditioning material, interior/exterior construction material, freshness preservation material, storage equipment, room interior items and fittings and equipment that improve the air and natural environment by providing a constant release of negative ions beneficial to the human living environment.

2. Description of the Prior Art

It is well-known that being near the pool below a waterfall or a fountain or the like can give people a cool, refreshed feeling. In recent years, research has shown that this is an effect generated by negative ions from the molecules of water. Various proposals have been made concerning this type of effect that negative ions have. For example, there have been disclosed proposals to use the effect to preserve the freshness of foods.

Methods of introducing negative ions into people's living environments include air cleaners that utilize corona discharge or electron beams to generate negative ions. There is also known a method of supplying a room with negative ions by blowing air through a resin fiber filter that contains powdered tourmaline.

However, an air cleaner does not generate negative ions in a sufficient quantity to provide an adequate effect, and consumes electricity to generate the ions. Moreover, if an air cleaner is to be run nonstop for extended periods of time, it has to be checked and maintained. In addition, a machine that utilizes corona discharge to generate negative ions, at the same time also generates nitrogen oxides, ozone, active oxygen and other gases that have a harmful effect on the human body. Also, in the case of a filter that contains powdered tourmaline, an apparatus and a drive source are required to blow air through the filter.

An object of the present invention is to provide a liquid composition that can provide a constant release of large quantities of negative ions without requiring a stimulus such as an abrasive force or continuous external stress or the like. Another object of the present invention is to provide a liquid composition that can provide a constant release of large quantities of negative ions without requiring any special apparatus or drive source. Another object of the present invention is to provide articles that give rise to negative-ion based effects such as an air-cleaning effect, living environment improvement effect, flavor modification effect, freshness preservation effect, and deodorizing effect.

SUMMARY OF THE INVENTION

It was discovered that by finely powdering a mineral that generates negative ions and maintaining the surface specific resistance of the substance around the finely powdered mineral within a set range, it was possible to obtain a constant release of large quantities of negative ions from the finely powdered mineral. Thus, to attain the above object, the present invention provides a liquid composition formed into a coating layer state in which negative ions are steadily released, the liquid composition comprising a finely powdered mineral that generates negative ions mixed with a binder liquid that is conductive and/or a binder liquid in which a conductive substance is dispersed.

The present invention also provides a flavor modification material that modifies flavors of beverages and comestibles, the flavor modification material comprising a conductive coating layer containing a finely powdered mineral that generates negative ions, formed on equipment that come into contact with or proximity to beverages and comestibles.

The present invention also provides a flavor modification method of modifying flavors of beverages and comestibles, that comprises the step of placing beverages and comestibles in an environment formed by a conductive coating layer containing a finely powdered mineral that generates negative ions.

The present invention also provides an air-conditioning material, interior/exterior construction material, freshness preservation material, storage equipment, room interior items and fittings and equipment comprising a conductive coating layer containing a finely powdered mineral that generates negative ions.

As described in the foregoing, by forming a coating layer of the liquid composition of the present invention, the liquid composition coating layer is able to generate large quantities of negative ions without the application of a stimulus such as a continuous external stress. Thus, using the liquid composition of this invention on various articles enables its various diverse effects to be implemented, easily and economically. Further features of the invention, its nature and various advantages will be more apparent from the accompanying drawings and following detailed description of the invention.

DESCRIPTION OF THE PREFERRED EMBODIMENTS

Figure 1:
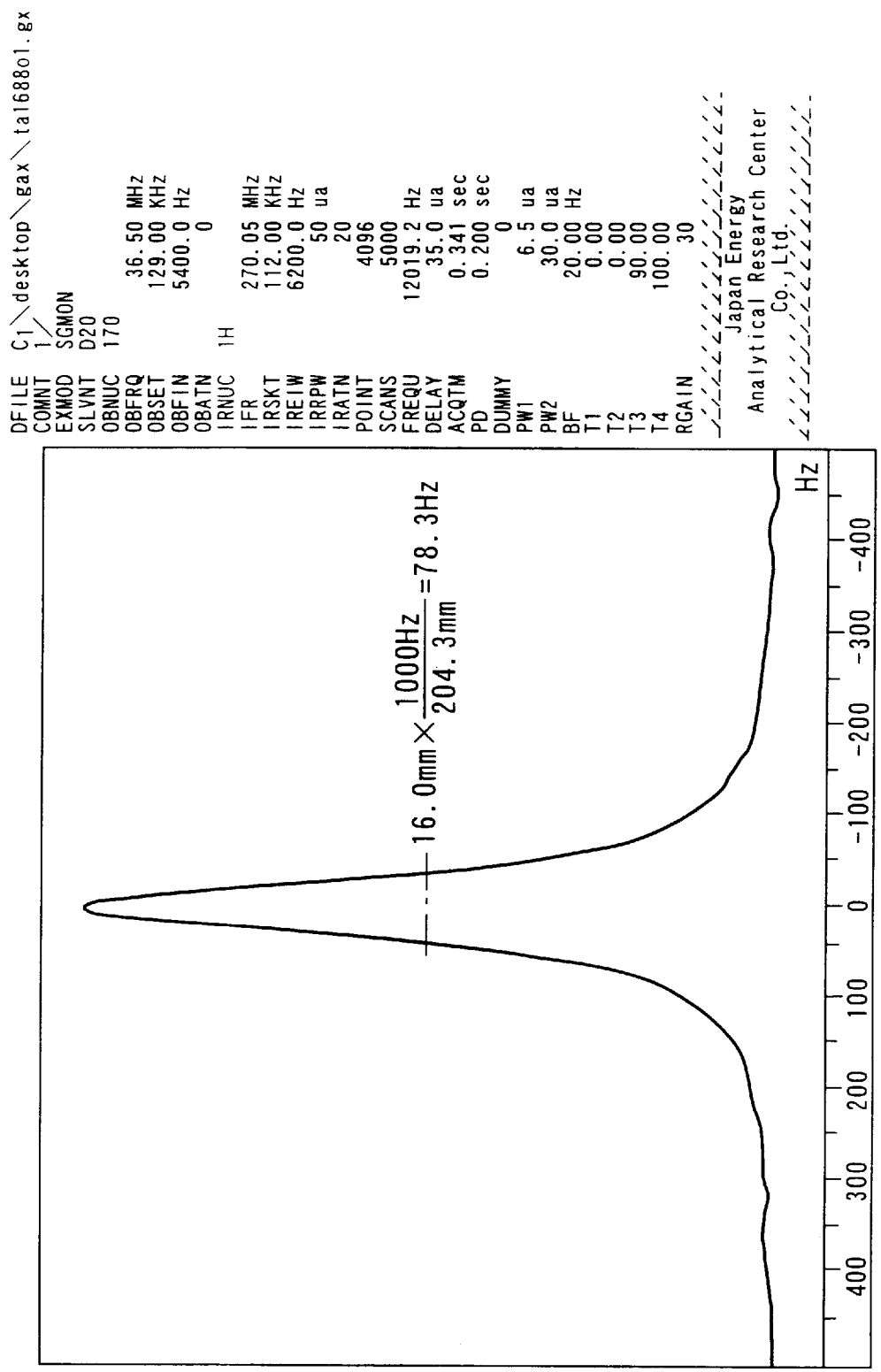
FIG. 1 is a graph showing the peak width at half height $^{17}$O-NMR (nuclear magnetic resonance) signal of modified water obtained by contacting purified water (raw water) with garnet.

The present inventors were able to perfect this invention using a discovery based on the outcome of much research and experimentation. The discovery was that, while finely powdering a negative-ion-producing material resulted in the release of only a small quantity of negative ions, it was possible to generate large quantities of negative ions without the application of a stimulus such as a continuous external stress, by maintaining the surface specific resistance of the material around the finely powdered mineral within a set range. That is, the present invention provides a liquid composition formed into a coating layer state in which negative ions are steadily released, said liquid composition comprising a finely powdered mineral that generates negative ions mixed with a binder liquid that is conductive and/or a binder liquid in which a conductive substance is dispersed. The substance or material around the finely powdered mineral used throughout the description indicates all other than the finely powdered mineral.

The conductive binder liquid or binder liquid in which a conductive substance is dispersed may be any liquid that can be formed into a coating, such as paint. Many paints can be used, other than insulating paint, electrocoated paint and other such paints that, when given a conductivity that is within a certain range, will focus the negative ions, thereby markedly departing from the original aim of the coating. Examples of the wide range of paints that can be used include oil-base paint, water-base paint, alcohol-base paint, cellulose paint and synthetic resin paint. Of these, acrylic ester copolymer emulsion resin, one of the water-based emulsion polymerization paints, is an ideal choice.

Examples of a conductive material that can be used to give the binder liquid conductivity within the set range include silver powder, copper powder, powders of other conductive metals, carbon powder, powdered carbon-fiber, whiskers of gallium titanate, and so forth. One, two or more of these components can be selected for use. While it will vary depending on the type of conductive substance used, to be effective the conductive substance should be added to the binder liquid in an amount that is from 5 to 20 parts by weight for every 100 parts by weight of the binder liquid. By adding the conductive material to the binder liquid so that when the composition is applied as a coating, the coating is given a suitable surface specific resistance within the range $10^5$ to $10^8$ $\Omega$cm, it is possible to generate large quantities of negative ions from the negative ion generating mineral added to the binder liquid.

Garnet and tourmaline are examples of minerals that can be used to generate negative ions. Other examples include mineral oxides obtained by sintering minerals such as zirconium, barium, lanthanum, cerium, and neodium. These can be used alone or in combinations of two or more. Using 99 to 1 weight percent garnet together with 1 to 99 weight percent of a sintered mineral oxide of zirconium, barium, lanthanum, cerium or neodium or the like should provide a particularly marked negative-ion release effect, since the latter minerals will have the effect of exciting the negative-ion generating action of the garnet.

One to 30 parts by weight of mineral to 100 parts by weight of binder liquid (solid content of 33%) is the most suitable amount of negative-ion generating mineral to add. Preferably, the mineral should be powdered to an average powder particle size of not more than 300 $\mu$m, although an average particle size of up to 5 mm can be used. When the liquid composition thus constituted is used to form a coating layer, the negative-ion generating mineral is a spontaneous-polarizing polar crystallization in which plus and minus polarities are spontaneously produced at the ends, with the potential being maintained permanently. Therefore, a minute current constantly flows from the plus pole to the minus.

When the surface specific resistance of the substance around the powdered mineral, such as the binder liquid, conductive substance and the like, is high and the conductivity is low, the electrification property increases, so the minute current is reduced, suppressing the release of negative ions. When there is a low surface specific resistance and high conductivity, the potential between adjacent mineral particles is neutralized, also suppressing the release of negative ions. When the liquid composition is in the form of a coating layer and the surface specific resistance of the substance around the mineral particles is within the range of $10^5$ to $10^8$ $\Omega$cm, the possession of the suitable level of conductivity enables the release of negative ions at the surface of the coating layer to be maintained at a high level.

Figure 2:
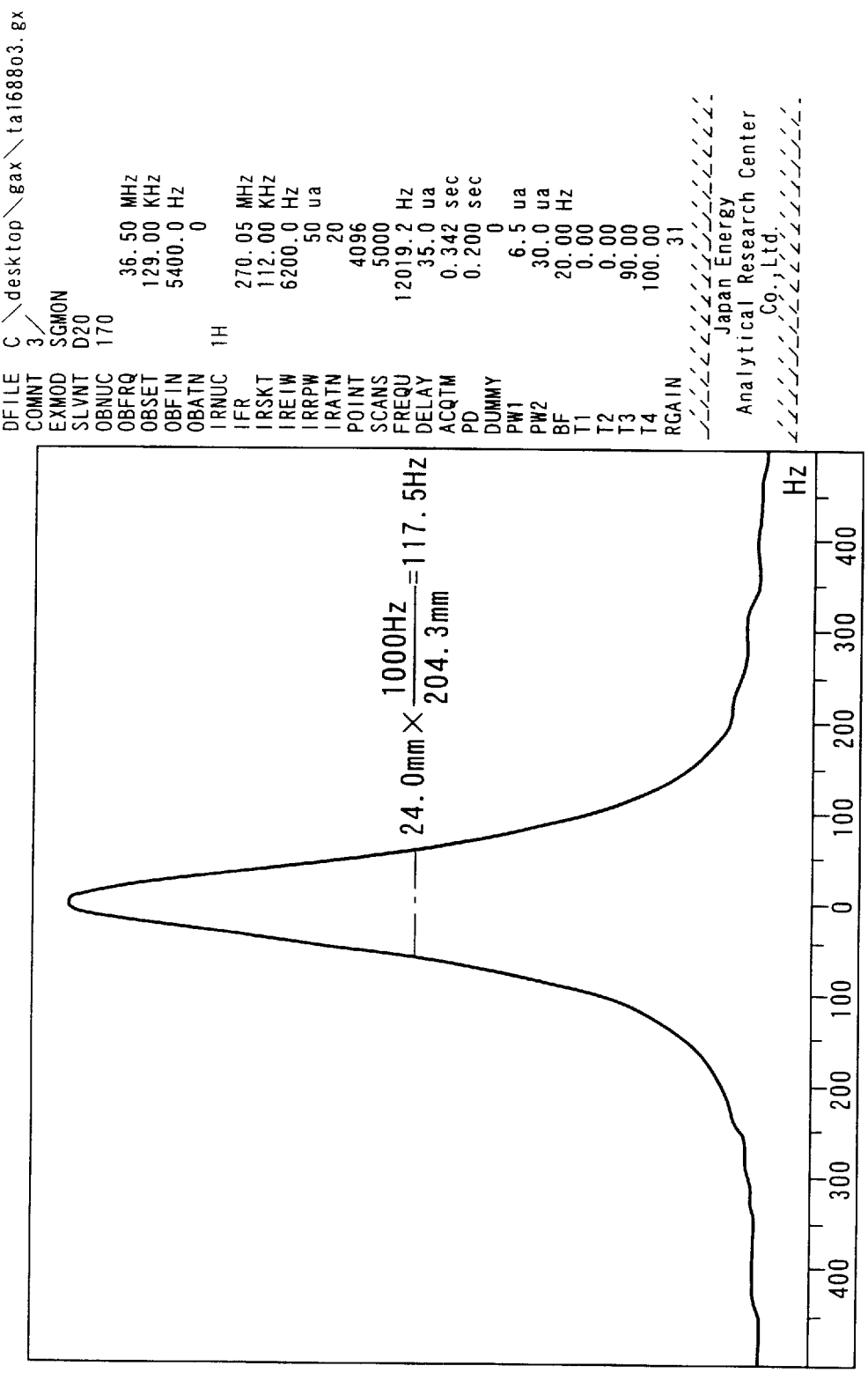
FIG. 2 is a graph showing the peak width at half height $^{17}$O-NMR signal of purified water.

The present inventors also obtained important findings with respect to negative ion generation and the accompanying mechanism. That is, it was known that particles of garnet, for example, might have very weak electrical energy. But, when these garnet particles are contacted with water, it was confirmed that, as is clearly revealed by FIGS. 1 and 2, the peak width at half height $^{17}$O-NMR signal of raw water decreases from 117.5 Hz to 78.3 Hz. This signifies that bringing the water into contact with the garnet brings about a reduction in the size of molecule clusters in the raw water, and that monomolecular water is produced from these smaller clusters. Moreover, through other experiments, it was confirmed that when water having a pH of 6.7 to 6.9 is passed through a packed column of garnet particles, the pH changes to 8.8 to 10.0 within a short period ranging from one to a few minutes. There were also minute quantities of ions eluted from the garnet particles, but these did not produce this change in the pH. Thus, the water molecules exhibit a state of equilibrium expressed by:

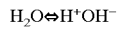

with the hydrogen plus ion concentration [H$^+$] in neutral regions being $10^{-7}$ mol/$\lambda$ (ph 7). However, this state of equilibrium was destroyed by the contact between the water molecules and the garnet particles, causing some of the hydrogen plus ions (H$^+$) to be given off from the water as hydrogen gas (H$_2$). As a result, the concentration of hydroxyl group minus ions [OH$^-$] increases, rendering the modified water alkaline. Also, the hydroxyl group minus ions [OH$^-$] bond with water molecules (H$_2$O) in the vicinity, forming a buildup of hydroxyl minus ions [H$_3$O$_2^-$] in the water, and a relative stabilization. Thus, the new findings were that the garnet particles have polar crystallizations which have the effect of refining the water molecule clusters in a short space of time, and that the garnet particles have electrical characteristics that increase the negative ions, turning the water alkaline.

Furthermore, if, for example, 99 to 1 weight percent garnet is used together with 1 to 99 weight percent of a sintered mineral oxide of zirconium, barium, lanthanum, cerium or neodium or the like, with respect to the principle behind the generation of negative ions in air, it was found that when moisture in the air contacts a surface coated with a binder liquid containing mineral particles that promote the electrical characteristics of garnet particles, the water promptly turns into air containing small clusters of water molecules, becoming negatively-charged hydroxyl minus ions [H$_3$O$_2^-$], whereby negative ions are generated in larger quantities than are generated by garnet particles alone.

That is to say, in this invention, it is important to form a coating layer that in addition to containing particles of minerals that generate negative ions, also has conductivity. Thus, the liquid composition used to form this coating layer comprises a finely powdered mineral that generates negative ions combined with a binder liquid that is conductive and/or a binder liquid in which a conductive substance is dispersed.

As described above, the known effects of negative ions include that they clean the air, improve the living environment and maintain the freshness of foods. Thus, by maintaining the surface specific resistance of the material around the negative-ion generating mineral particles within a set range, the liquid composition of the invention makes it possible to exhibit these effects without any constraints, by generating large quantities of negative ions without continuous application of an external stress or other such stimulus.

On the basis of the above findings, looking at the above effects, it can be surmised that with respect to the food freshness preservation effect, for example, the negative ions prevent oxidation by protecting the food from oxide components either in the air or on the surface of the food. Particularly in the case of food that includes water, it is surmised that the negative ions preserve the freshness by preventing oxidation by making the surface water alkaline.

It was also found that when the liquid composition of the invention was coated on the inside surface of plates, glasses, cups and other such eating and drinking utensils and articles, the flavor of beverages and comestibles coming in direct contact with the coated surface is modified. This is probably due to the surface components of the beverages and comestibles being modified by the large quantities of negative ions given off by the coating layer. While it cannot be denied that the modification effect of the negative ions may be also enhanced by infrared radiation or the like, at this point, this has not been fully confirmed, and as such is a matter for future study. What can be said at this stage is that, at least with respect to foods that contain water, it can be surmised that there is a correlation between the alkalization of the water content by the negative ions, and the flavor modification. It was also confirmed that a similar flavor modification effect could be obtained even without direct contact. Specifically, the flavor modification effect could be obtained by placing the item concerned in close proximity to the coating, preferably in a sealed space. Although tea leaves, coffee beans and tobacco have a low water content, it was found that under the same conditions, their flavor could be modified. Although it is not surmised that this is the result of the alkalization of the water content, it is conceivable that some of the aromatic components and other constituents of the tea leaves, coffee beans and tobacco would be modified by the negative ions.

The liquid composition of this invention can be coated on containers and wrapping materials that come into direct contact with beverages and comestibles, or formed into containers having close proximity thereto, such as cans and cigar cases, as well as covers and lids. That is, articles used in everyday life are ideally suited for the flavor modification material of the invention.

Below are cited various items that can be coated with the liquid composition of the present invention.

1. Flavor modification material:

Coated crockery items will be in direct contact with beverages and comestibles for at least several minutes. However, the short contact time of spoons, forks, chopsticks and the like means that the alkalization effect will be relatively low. In each case, it is possible to directly modify the flavor of food and drink. In the same way, wrapping coated for flavor modification is able to achieve a good modification effect, due to the long contact time involved.

An adequate flavor modification effect can be achieved even without direct contact, if there is close proximity. For example, forming the liquid composition into containers such as cans and cigar cases brings the contents into close proximity with the flavor modification material, and in a sealed space, thereby enabling the achievement of the intended flavor modification effect. While it is only a supposition, particularly with respect to cigar cases, as touched on above, this flavor modification may be the result of the modification of some aromatic components and the like, combined with the adsorption of negative ions on particles of tobacco within the space filled by tobacco leaves. A sufficient flavor modification effect can also be obtained by coating the liquid composition on covers and lids used on cooking pots and pans to keep flies from touching the contents, prevent the water content from escaping as water vapor, and keep in the heat. Coating tables, tablecloths, dining-table accessories such as vases, plates, coasters and so forth also contributes to the flavor modification effect by producing large quantities of negative ions in the vicinity of the food and drink.

2. Air-conditioning material:

Coating ribbons, fans and other items attached to blower vents of car and room air-conditioners, and louvers, will result in negative ions being generated, including when the air-conditioners are off. This also applies to mechanically operated components (blower section). Coating the liquid composition on the various types of fans and the vanes of electric fans will enable a steady release of negative ions, whether the fans are being used or not. Negative ions also have an air-cleaning effect by preventing the adhesion of dust and the generation of mold and fungi. Application to the above items means that the coating is forcefully brought into contact with the moisture in the air, so the air-cleaning and living environment improvement effects are pronounced. A flow of air generated by the fans, air-conditioners or the like can be directed onto food, thus functioning as flavor modification materials.

3. Interior/exterior construction material:

Interior/exterior construction materials such as cemented excelsior board, tatami, wallpaper and wall and ceiling materials are items not generally used to apply abrasive force or external stress. However, the present invention can also be used for such applications to generate negative ions in living areas, many of which are semi-sealed spaces, enabling such areas, and the people living in them, to benefit from the air-cleaning and living environment improvement effects. The large surface area of tatami and cemented excelsior boards make those items particularly suitable. Such interior/exterior construction materials will also have the effect of modifying the flavor of beverages and comestibles that are nearby. A deodorizing effect can be achieved by using the coating on materials used in toilets and bathrooms, and materials used for the interiors and exteriors of barns and poultry sheds.

4. Freshness preservation material:

This includes merchandise display cases, shelving, fruit display platters, food trays, nets, cushions and other such items used in supermarkets and other stores. Application to such items helps the freshness to be maintained and eliminates odors. It is particularly useful for preventing the diminishment of ascorbic acid contained in foods. Used in this way, the coating enhances the good antimicrobial effect that ascorbic acid is known to possess. In this case too, the stores comprise many semi-sealed areas, enabling the premises, store personnel and customers to receive the benefit of the air-cleaning and living environment improvement effects. Coated items will also act as flavor modification materials with respect to beverages and comestibles placed in proximity thereto.

5. Storage equipment:

When used on storage items such as cans, cigar cases and other containers, the result is a major contribution to preventing degradation caused by oxidation.

6. Room interior items:

Coating pillows, bedding, curtains and other such room interior items enables generation of large quantities of negative ions in living areas, cleaning the air and improving the living environment. Mats are particularly suitable, because of their large surface area. With respect to pillows consisting of cypress chips or the like in a fabric cover and a linen pillowcase, the liquid composition can be applied to the chips or the cover, or to the inside surface of the pillowcase. With respect to bedding, it is preferable for the composition to be applied to the inside of the fabric used in futon mattresses and covers. In use, pillows and bedding absorb a considerable amount of perspiration, but when coated with the liquid composition of the invention, perspiration odors are eliminated.

The deodorizing effect of the liquid composition can also be used to eliminate smells from trash cans, the kitchen, the toilet, and pet-related items. Coated shoe inlays, sandals and so forth should have a ridged or other non-smooth surface configuration so that the negative ions that are released are not blocked by the sole of the foot. Such a surface configuration also increases the surface area from which the negative ions are released.

7. Fittings and equipment:

The liquid composition can be applied to decorative items, fittings, equipment such as work helmets and the like. Doing this ensures that the persons concerned are usually in an environment in which large quantities of negative ions are being released, cleaning the air and enhancing the living environment. When applied to the inside of a helmet, it helps to suppress perspiration and perspiration odor.

8. Other items:

Coating planters to generate negative ions on the inside surface of the planters, is equivalent to applications in which the composition has direct contact with the moisture component. Used in this way, the monomolecular action of the water molecules promotes plant growth.

9. Applications other than the above:

The experimental results described above relating to the alkalization of water by the negative ions should find various uses, since it is a very much easier way than the prior art method of producing alkaline-ion water, which requires the use of electrical energy and special equipment. For example, it is known that livestock that drinks alkaline-ion water grows faster, and there has been some confirmation of the anti-bacterial properties of such water, so these are areas in which the present invention can be expected to be applied.

Various additives can be blended in with the liquid composition, to the extent that the resulting composition does not depart from the scope of the invention, and various methods may be used to coat or otherwise apply the composition. The liquid composition of the invention can be used as a paint, in which case various additives can be blended in with the paint, to the extent that the resulting composition does not depart from the scope of the invention, and various methods may also be used to apply the paint.

The quantity of negative ions released from the formed coating layer is proportional to the surface area of the coating. In some cases, a smooth coating formed using the liquid composition may not provide a sufficient environment enhancement effect in large interior spaces such as a gymnasium or lecture hall. In such settings, it is preferable to form the coating over a large surface area. There are methods for applying the liquid composition to a target item or material having a large surface, applying the liquid composition to a permeable material without losing the permeability, and forming the coating, and then processing the surface to increase the surface area. Thus, there are cases in which the coating layer of the present invention is a continuous layer, and cases in which it is not.

An example of the present invention will now be described below. However, the present invention is not limited thereto.

EXAMPLE 1

A liquid composition was prepared by adding 10 parts by weight of carbon-fiber particles (Tosca, made by Toray Co., Ltd., Japan) constituting the conductive material to 100 parts by weight of a water-base paint having an acrylic copolymer emulsion as its main component (Fyua Coat FX made by Gantan Fyutek Co., Ltd., Japan) and further adding thereto under sufficient agitation 10 parts by weight of a mixture of particles (having an average particle diameter of 5 $\mu$m) comprising 5 wt % garnet and 95 wt % sintered mineral oxides (excitation materials) such as zirconium, barium, lanthanum, cerium, and neodium. The liquid composition thus formed was used to provide a room having a floor area of 10 square meters and a wall area of 17 square meters with a 220 g/m$^2$ coating, which was allowed to dry at room temperature. The coating had a surface specific resistance of 2.3×10$^6$ $\Omega$cm. The concentration of negative ions in the room was 250 to 400 ions per milliliter of air, providing a sufficient air-cleaning effect.

A room of the same size was prepared in the same way, except that it was not given a coating of the liquid composition. Enough coffee and cigarettes for ten people were placed in each room. In the rooms, thirty men and women selected at random were asked to drink coffee and smoke if they wished to. The results were as follows. It can be noted that the participants were not given any information about this, and the room coated with the liquid composition was referred to as room A and the other room as room B.

All thirty participants confirmed that the coffee had a different taste depending on the room, with the coffee in room A having a more mellow flavor than the coffee in room B, with less bitterness. Ten of the participants smoked, of which nine stated that in room A the cigarettes had a smoother, lighter taste. Continuing on, after one hour, the twenty non-smokers were taken into each room to check the deodorizing effect. All confirmed the deodorizing effect of room A.

The inside surface of a translucent cover for using in microwave ovens was coated with the liquid composition and allowed to dry, forming a flavor modification material. Consomme soup was then poured into bowls and covered using the coated cover and an uncoated cover. The response of all thirty participants confirmed that there was a difference in taste. The participants were not given any information about this. The cover coated with the liquid composition was referred to as cover C, and the uncoated cover as cover D. In describing the difference, all thirty participants said that the soup prepared using cover C had a smoother taste than the soup prepared using cover D.

The frame of a folding fan was coated with the liquid composition and allowed to dry. The coating covered about 50% of the area of the open fan. A model IC-10 ion detector manufactured by Universal Planning Corporation, Japan was used to confirm the generation of negative ions. It was confirmed that in a still state, several hundred negative ions per milliliter of air were generated. The coated fan was used to fan the air for several minutes in a sealed smoking room, after which several people who hated smoking were brought into the room. This made it possible to confirm that compared to a fan having the same structure but no coating, the coated fan clearly had a deodorizing effect.

A 40 mm Gantan board (cemented excelsior board) made by Gantan Beauty Industry Co., Ltd., Japan was coated with the liquid composition and allowed to dry. It was confirmed that the quantity of negative ions generated increased by 300 to 500. It was confirmed that this was the result of selecting a target item having a large surface area.

A styrene foam tray was coated with the liquid composition to form a freshness preservation material. Seven different types of fruit were placed on the coated tray and on a normal, uncoated tray, wrapped, and stored in a refrigerator. After one or two days, it was observed that the color of the fruit on the uncoated tray had changed, but while all other conditions were the same, the fruit on the coated tray did not exhibit any change of color, nor was any degradation of flavor observed. The ascorbic acid content of stored foods decreases with each passing day. However, in the case of the coated tray, the decrease was clearly less than in the case of an uncoated tray. It was considered that this maintenance of the antibacterial effect of the ascorbic acid had a major impact on the above fruit deterioration result.

The inside of a container used to hold loose tea was coated with the liquid composition and dried to form a treated storage article. After one month of use, the tea was compared to loose tea stored for the same period in an uncoated container. There was a loss of flavor in the case of the tea stored in the uncoated container, but virtually no deterioration was observed in the case of the tea stored in the coated container.

The surface of a mat was coated with the liquid composition and dried, forming a room interior item. It was confirmed that the quantity of negative ions thus generated increased by 250 to 450. It was confirmed that this was the result of selecting a target item having a large surface area.

In a white pillow containing cypress chips and covered with a patterned pillowcase, the cypress chips and the inside surface of the white cover were coated with the liquid composition and dried. After one week of continuous use, a comparison between this pillow and an ordinary untreated pillow confirmed that a person using the treated pillow felt better when getting up. It was also confirmed that the treated pillow suppressed the odor of perspiration.

The inside and outside surfaces of a work helmet were coated with the liquid composition and dried to form a fittings and equipment item. After one week of on-site use during construction of a roof, it was confirmed that compared to a normal, uncoated helmet, the coated helmet had a perspiration suppressing effect that reduced the discomfort caused by perspiration.

As described in the foregoing, the liquid composition of this invention can provide a constant release of large quantities of negative ions without any need of a stimulus such as an abrasive force or continuous external stress or the like. The invention can be applied to many types of item, enabling its various diverse effects to be utilized with ease and economy. For example, applying the liquid composition to utensils that contact or are used in close proximity to beverages and comestibles makes it possible for the flavor of such beverages and comestibles to be modified by the resultant release of large quantities of negative ions. The liquid composition of the invention can be applied in the form of various types of paint, making it easy and economical to form coatings, since no special processing is required.

When the liquid composition is applied to air-conditioning articles, interior/exterior construction materials, freshness preservation materials, storage equipment, room interior items and fittings and equipment, the effects of the negative ions include cleaning of air, an enhanced living environment, modification of food flavor, and suppression of odors. The air-cleaning and enhanced living environment effects are particularly marked in the case of air-conditioning that supplies humid air, since the coated surfaces actively contact the water particles in the air, so the flow of air is accompanied by the release of negative ions. In addition to the air-cleaning effect, a deodorizing effect is also provided when the coating is used on materials used in toilets and bathrooms, and on materials used for the interiors and exteriors of barns and poultry sheds. Moreover, the freshness preservation material also has the effect of modifying the flavor of beverages and comestibles in the proximity. In particular, it enables the anti-microbial action of ascorbic acid contained in foods to be sustained. Storage equipment items help to prevent oxidation-based degradation, and also exhibit a flavor modification effect. On trash cans, in the kitchen, in the toilet, on pet-related items, shoe inlays, sandals and other such items, the liquid composition can be used to suppress odors as well as to clean the air.

What is claimed is:

1. A liquid composition releasing negative ions, comprising:

a finely powdered mineral that generates negative ions and has a composition of 99 to 1% by weight of garnet and 1 to 99% by weight of an excitation material comprised of sintered mineral oxide of a mineral containing zirconium, barium, lanthanum, cerium, neodymium or mixtures thereof; and a resin binder liquid which is conductive and/or in which a conductive substance is dispersed mixed with said finely powdered mineral;

wherein negative ions are steadily released when said liquid composition is formed into a coating layer state and in said state said composition has a surface specific resistance in the range of $10^8$ to $10^8$ Ωcm.

2. The composition of claim 1, wherein said resin binder liquid is conductive.

3. The composition of claim 1, wherein a conductive substance is dispersed in said resin binder liquid.

4. A liquid composition according to claim 1, wherein said conductive substance is added to the resin binder liquid in an amount of from 5 to 20 parts by weight for every 100 parts by weight of resin binder liquid.

5. A liquid composition according to claim 4, wherein said conductive material is at least one selected from the group consisting of silver powder, copper powder, carbon powder, powdered carbon-fiber and gallium titanate whiskers.

6. Interior or exterior construction material comprising a conductive coating layer of claim 1 formed on front and/or rear surfaces of the interior or exterior construction material.

7. Interior or exterior construction material comprising a conductive coating layer comprising the composition according to claim 1.

* * * * *

UNITED STATES PATENT AND TRADEMARK OFFICE
CERTIFICATE OF CORRECTION

PATENT NO. : 6,649,090 B2  Page 1 of 1
DATED : November 18, 2003
INVENTOR(S) : Funaki et al.

It is certified that error appears in the above-identified patent and that said Letters Patent is hereby corrected as shown below:

<u>Title page, Item [54] and Column 1, lines 1-8,</u>
Title, should read:
-- [54] LIQUID COMPOSITION, FLAVOR MODIFICATION MATERIAL, FLAVOR MODIFICATION METHOD, AIR-CONDITIONING MATERIAL, INTERIOR/EXTERIOR CONSTRUCTION MATERIAL, FRESHNESS PRESERVATION MATERIAL, STORAGE EQUIPMENT, ROOM INTERIOR ITEMS AND FITTINGS AND EQUIPMENT --

Signed and Sealed this

Second Day of March, 2004

JON W. DUDAS
*Acting Director of the United States Patent and Trademark Office*